3,372,144
LOW TEMPERATURE AMINOALKYLDICYANDI-
AMIDE CURING AGENTS FOR EPOXY RESINS
Arnold Drucker, Stamford, Conn., assignor to American
Cyanamid Company, Stamford, Conn., a corporation
of Maine
No Drawing. Filed Jan. 25, 1966, Ser. No. 522,839
5 Claims. (Cl. 260—47)

This invention relates to novel, useful polyepoxide-containing curable compositions in general, and particularly, thermosetting epoxy resinous compositions which may be cured at low temperature because of the inclusion of a novel curing catalyst.

Of recent years polyepoxide-containing compositions and particularly, thermosetting epoxy resinous compositions have achieved wide commercial importance, particularly in the adhesives market. This increased interest has led to a stimulation in research directed toward achievement of better methods of curing these adhesives at relatively low temperatures.

At present the most commonly used curing agent for polyepoxide adhesive compositions for use at elevated temperatures is dicyandiamide. However, a very serious disadvantage involved with this curing agent and several others of the same general type is that they require a curing temperature of the order of 325° F–350° F. to effect a satisfactory bond between the structural elements being glued together. This deficiency has a particularly marked effect leading to a drastically restricted use of this excellent adhesive bonding agent, especially in the aerospace and missile manufacturing industry because at these required high cure temperatures of application the aluminum metal sections which are being bonded together are adversely affected due to metal crystallization. Hence, at present, it would be of great value to have available a curing agent which permits cure of epoxy adhesive compositions at temperatures of 175° F. or lower where no stress is created in the air frame members being bonded together.

I have now discovered that relatively small amounts of a novel curing agent having the following structure will so modify an epoxy resinous adhesive as to avoid the aforesaid deficiency of the prior art and permit molding of epoxide resins at low temperatures. Such curing agents may be represented by the graphic formula:

(I)

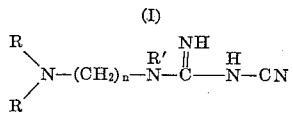

wherein each R represents either the same or a different lower alkyl group of 1 to 6 carbon atoms inclusive, such as methyl, ethyl, propyl, n-butyl, amyl, although it has been found that those members wherein each R group is either methyl or ethyl are preferred for efficiency of epoxide conversion, R' represents either hydrogen or an aralkyl group preferably benzyl and n represents an integer from 2 to 10. More specifically, the function and practice of the present invention permits the preparation of poly-epoxide-containing compositions which have good mechanical properties at higher temperatures, and yet are capable of being cured at temperatures of 175° F. or lower to form insoluble and infusible bonds between aluminum metal segments.

It is, therefore, an object of my invention to provide novel curable polyepoxide-containing adhesive compositions capable of being cured to infusible solids at temperatures of 175° F. or lower.

It is, also a further specific object of my invention, to provide a novel curable polyepoxide-containing composition, especially a thermosetting epoxy resinous composition containing as a curing catalyst a 3-diethylaminopropyldicyandiamide.

These and other objects of my invention will be discussed and become clear from a consideration of the ensuing specification.

Accordingly, substituted aminoalkyldicyandiamide curing agents employed in the practice of the present invention as well as methods for the preparation are so well known in the art that a detailed discussion of said methods herein is not believed necessary. In addition to the aforesaid 3-diethylaminopropyldicyandiamide the compounds 1 - (2-dimethylaminoethyl)-1-benzyldicyandiamide, dimethylaminopropyldicyandiamide, and 3-dipropyl-aminopentyldicyandiamide to name a few other members of the class are also particularly useful low temperature curing agents for epoxide adhesives.

The novel substituted aminoalkyldicyandiamide curing agents of my invention may be employed in amounts of from about 5 to 50 parts per hundred parts of epoxide resin sought to be cured. As a preferred level of addition of the curing agents, excellent results have been obtained with the addition of about 10 parts of the above described curing agent to each one hundred parts of resinous adhesive. In any event, the amount of curing agent employed in a given case will vary slightly with the particular degree of cure desired and the curing conditions.

It is significant that the aforesaid curing agents do not produce any apparent cure over the cycle of 130° F. for 90 minutes and hence, the fluidity of a curing agent-epoxide system remains apparently unchanged. This particular property is advantageous from two distinct aspects. First, it facilitates plant preparation of the adhesive in tape form since solution coating may be required. Solvent must then be removed at slightly elevated temperatures. Quite obviously, it would be undesirable for cure to initiate at this stage. Secondly, the adhesive will remain fluid during heat up of the entire assembly being bonded and therefore, provide the necessary filleting action which is particularly important in bonding aluminum honeycomb to aluminum sheet or "skin" as it is referred to in the art. In brief, the range of cure of the novel adhesive compositions containing my low temperature curing agents permits not only control to avoid too high temperature, but, also permits facility of low temperature handling.

The polyepoxide-containing compositions which can be cured using my novel catalysts comprise organic materials having a plurality of reactive 1,2-epoxy groups, i.e.,

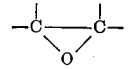

groups. These polyepoxide materials can be monomeric or polymeric, saturated or unsaturated, aliphatic, cycloaliphatic, aromatic or heterocyclic, and they may be substituted, if desired, with other substituents besides the epoxy groups, e.g., hydroxyl groups, ether radicals, halogen atoms, and the like.

A widely used class of polyepoxides which can be catalyzed according to the practice of the present invention encompasses the resinous epoxy polyethers obtained by reacting an epihalohydrin, such as epichlorohydrin, epibromohydrin, epiiodohydrin, and the like, with either a polyhydric phenol or a polyhydric alcohol.

Among the polyhydric phenols which can be used in preparing these resinous epoxy polyethers are dihydric phenols represented by the general formula:

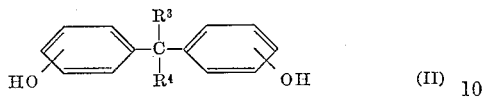

wherein the phenolic hydroxy groups may be in any of the 2,2′, 2,3′, 2,4′, 3,3′, 3,4′ or 4,4′ positions on the aromatic nuclei, and each of $R^3$ and $R^4$ represent hydrogen, an alkyl group, such as methyl, ethyl, propyl, isopropyl, butyl, sec-butyl, tert-butyl, pentyl, isopentyl, hexyl, isohexyl, and the like; a cyclo(lower)-alkyl group, such as a cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl, and the like. In addition, the phenolic rings may have other substituents besides the hydroxyl groups, for example lower alkyl groups containing from 1 to 4 carbon atoms, i.e., methyl, ethyl, propyl, isopropyl, butyl, sec-butyl and tert-butyl groups, halogen atoms, i.e., fluorine, chlorine, bromine or iodine, and the like.

An illustrative but by no means exhaustive listing of dihydric phenols falling within this general formula includes 4,4′-dihydroxydiphenyldimethylmethane (bisphenol A),
2,4′-dihydroxydiphenylethylmethane,
3,3′-dihydroxydiphenyldiethylmethane,
3,4′-dihydroxydiphenylmethylpropylmethane,
2,3′-dihydroxydiphenylethylphenylmethane,
4,4′-dihydroxydiphenylpropylphenylmethane,
4,4′-dihydroxydiphenylbutylphenylmethane,
2,2′-dihydroxydiphenylditolylmethane,
4,4′-dihydroxydiphenyltolylmethylmethane, and the like.

Other polyhydric phenols which may also be co-reacted with an epihalohydrin to provide these resinous epoxy polyethers are such compounds as resorcinol, hydroquinone, substituted hydroquinones, e.g., p-tert-butylhydroquinone, and the like, indanols such as those disclosed in U.S. Patent No. 2,754,285 to Petropoulos, and polyhydric phenols having two hydroxy aryl groups separated by an aliphatic chain of at least six carbon atoms in length, said chain being attached by carbon-to-carbon bonding to nuclear carbon atoms of the hydroxyaryl groups. Members of this latter class of polyhydric phenols can be conveniently obtained by condensing phenol itself with a phenol substituted with an aliphatic side chain having one or more olefinic double bonds positioned therein, thus providing the required number of separating atoms between the two hydroxyphenyl groups of the resulting polyhydric phenol. Cardanol, obtainable in known manner from cashew nut shell liquid, is a convenient source of phenols containing such side chains.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethyleneglycols, polypropylene glycols, triglycerol, dipentaerythritol and the like, polyallyl alcohol, polyvinyl alcohol, polyhydric thioethers such as 2,2′-dihydroxydiethyl sulfide, 2,2′,3,3′-tetrahydroxydipropyl sulfide and the like, mercapto alcohols such as α-monothioglycerol, α,α′-dithioglycerol, and the like, polyhydric alcohol partial esters such as monostearin, pentaerythritol monoacetate and the like, and halogenated polyhydric alcohols such as the monochlorohydrins of glycerol, sorbitol, pentaerythritol and the like.

When preparing these resinous epoxy polyethers from an epihalohydrin and a polyhydric phenol, the reaction will preferably be carried out in the presence of an amount of an alkaline material, e.g., sodium hydroxide or potassium hydroxide, sufficient to combine with the halogen released by the epihalohydrin during the course of the reaction. The amount of epihalohydrin used is generally in excess of the stoichiometric quantity required for reaction with the epihalohydrin. In addition the reaction will preferably be carried out at a temperature ranging from about 50° C. to about 150° C., usually for periods of time ranging up to several hours.

When reacting an epihalohydrin with a polyhydric alcohol, the reaction is preferably carried out in the presence of an acid-acting material, e.g., hydrofluoric acid or a boron trifluoride-ether complex, and the resulting halohydrin product is then dehydrohalogenated in the presence of an alkaline material.

The resulting resinous reaction products may contain free terminal hydroxyl groups of terminal hydroxyl groups and terminal epoxy groups, and will vary in molecular weight depending on the reactants employed, the relative amounts thereof, and the extent to which the reaction is carried out. These thermosetting epoxy resinous materials are generally soluble in solvents such as acetone, methyl ethyl ketone, methyl isobutyl ketone, cyclohexanone, and the like.

A related class of polymeric polyepoxides which can be catalyzed according to the practice of the present invention comprises the polyepoxypolyhydroxy polyethers obtained by reacting, again preferably in alkaline medium, a polyhydric phenol such as bisphenol A, resorcinol, catechol and the like, or a polyhydric alcohol such as glycerol, sorbitol, pentaerythritol and the like, with a polyepoxide such as bis(2,3-epoxypropyl)ether, bis(2,3-epoxy-2-methylpropyl)ether, 1,2-epoxy-4,5-epoxypentane and the like.

Another class of polymeric polyepoxides which can be cured by means of the above described tetra- and pentaalkylguanidines includes the epoxy novolac resins obtained by reacting, preferably in the presence of a basic catalyst, e.g., sodium or potassium hydroxide, an epihalohydrin such as epichlorohydrin with the resinous condensate of an aldehyde, e.g., formaldehyde, and either a monohydric phenol, e.g., phenol itself, or a polyhydric phenol, e.g., bisphenol A. A representative number of the epoxy novolac resins obtained by reacting an epihalohydrin with a monohydric phenol-formaldehyde resinous condensate can be represented by the general formula:

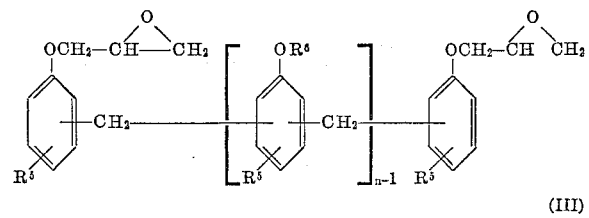

wherein, for example, $R^5$ represents either hydrogen or a lower alkyl group, such as methyl, ethyl, and the like, $R^6$ represents hydrogen, a halohydrin group, e.g.

a glycol group, e.g.,

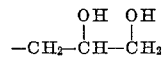

or a glycidyl group, i.e.,

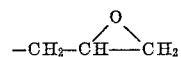

and $n$ is a number of 1 or greater. Similarly, a representative number of the epoxy novolac resins obtained by reacting an epihalohydrin with a polyhydric phenol-formaldehyde resinous condensate can be represented by the general formula:

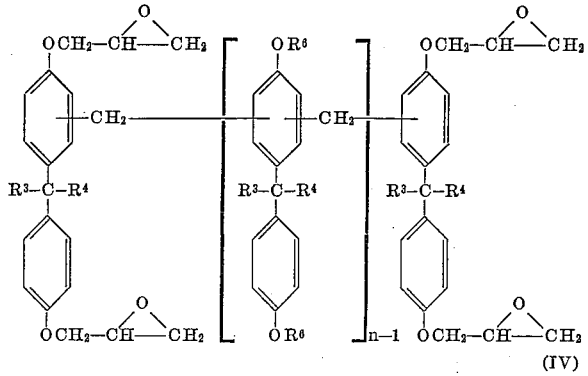

(IV)

wherein $R^3$ and $R^4$ are as defined for Formula II above and $R^6$ and $n$ are as defined for Formula III above. Further details concerning the nature and preparation of these epoxy novolac resins can be obtained in Carswell, T. S., "Phenoplasts" (New York: Interscience Publishers, 1947) page 29 et seq.

Still another class of polymeric polyepoxides which can be catalyzed with the above described tetra- and penta-substituted guanidines includes polymers, i.e., homopolymers and copolymers, of epoxy-containing monomers which also contain at least one polymerizable double bond. Such monomers can be polymerized through their double bonds in known manner, e.g., in bulk or in solution in an inert organic solvent such as benzene and the like, preferably by heating in the presence of oxygen or a peroxide catalyst but in the absence of alkaline or acidic catalysts, leaving the epoxy groups unaffected and, therefore, regularly or randomly dispersed along the polymer chains. Among such ethylenically unsaturated epoxy-containing monomers are vinyl 2,3-glycidyl ether, allyl 2,3-glycidyl ether, methallyl 2,3-glycidyl ether, methallyl 3,4-epoxybutyl ether, glycidyl acrylate, glycidyl methacrylate, 2,3-epoxypropyl crotonate, vinyl cyclohexane monoxide, 4-glycidyloxystyrene, and the like. Suitable comonomers for copolymerization with these ethylenically unsaturated epoxy-containing monomers include styrene, acrylonitrile, methacrylonitrile, methyl acrylate, ethyl acrylate, methyl methacrylate, vinyl chloride, vinylidene chloride, vinyl acetate, diallyl phthalate, and the like.

Among the monomeric polyepoxides which can be catalyzed according to the practice of the present invention are the di- and triepoxides represented by the general formula:

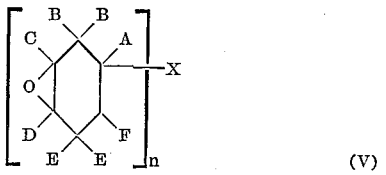

(V)

wherein A through F represent hydrogen or an alkyl group, preferably a lower alkyl group having from 1 to 4 carbon atoms, inclusive, such as methyl, ethyl, propyl, n-butyl and the like, and X represents a divalent radical which can be

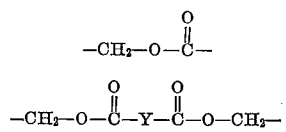

or

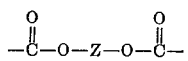

in which case $n$ equals 2, or a trivalent radical which can be

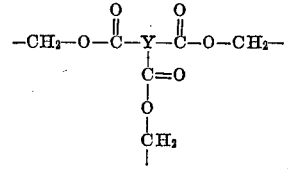

or

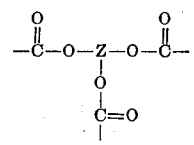

in which case $n$ equals 3, with Y representing an aliphatic or aromatic hydrocarbon radical containing from 2 to 12 carbon atoms, inclusive, and Z representing a lower aliphatic hydrocarbon radical or a lower oxyalkylene group, e.g., —alkylene—O—alkylene— and the like. Included among such di- and triepoxides are:

3,4-epoxycyclohexylmethyl 3,4-epoxycyclohexanecarboxylate,
3,4-epoxy-6-methylcyclohexylmethyl 3,4-epoxy-6-methylcyclohexanecarboxylate,
bis(3,4-epoxycyclohexylmethyl)maleate,
bis(3,4-epoxy-6-methylcyclohexylmethyl)succinate,
ethylene glycol bis(3,4-epoxycyclohexanecarboxylate),
2-ethyl-1,3-hexanediol bis(3,4-epoxy-6-methylcyclohexanecarboxylate),
tris(3,4-epoxycyclohexylmethyl) 1,2,4-hexanetricarboxylate,
glyceryl tris(3,4-epoxy-6-methylcyclohexanecarboxylate)

and the like.

Other monomeric polyepoxides which can be cured by means of the above described substituted guanidines include dicyclopentadiene dioxide, epoxidized triglycerides such as epoxidized glycerol trioleate, epoxidized glycerol trilinoleate, the diacetate of epoxidized glycerol trilinoleate and the like, 1,8-bis-(2,3-epoxypropoxy)octane,
1,4-bis(2,3-epoxypropoxy)cyclohexane,
1,4-bis(3,4-epoxybutoxy)-2-chlorocyclohexane,
1,3-bis(2,3-epoxypropoxy)benzene,
1,4-bis(2,3-epoxypropoxy)benzene,
1,3-bis(2-hydroxy-3,4-epoxybutoxy)benzene,
1,4-bis(2-hydroxy-4,5-epoxypentoxy)benzene,
1,3-bis(4,5-epoxypentoxy)-5-chlorobenzene,
4,4'-bis(2,3-epoxypropoxy)diphenyl ether, and epoxy ethers of polyabsic acids such as diglycidyl succinate, diglycidyl adipate, diglycidyl maleate, diglycidyl phthalate, diglycidyl hexachloroendomethylenetetrahydrophthalate and diglycidyl 4,4-isopropylidenedibenzoate, and the like.

Many of these polyepoxides, and particularly those which are polymeric, can be conveniently referred to in terms of epoxy equivalency, i.e., the average number of epoxy groups per molecule in the polyepoxide material. Where the polyepoxide is monomeric and all of its epoxy groups are intact, its epoxy equivalency will be represented by an integer, usually 2 or greater. However, where the polyepoxide is polymeric its epoxy equivalency will usually be represented by a fractional value of at least about 1.0 or greater, e.g., 1.5, 1.8, 2.3 and the like, since the polymer will usually contain molecules of different molecular weight and can also contain some monomeric polyepoxide or have some of its epoxy groups dehydrated or otherwise reacted.

It will be appreciated by those skilled in the art that the catalyzed polyepoxide-containing compositions which can be prepared according to the practice of the present invention are not limited to those containing the above described polyepoxides, but that said polyepoxides are to be considered merely as being representative of the class of polyepoxides as a whole. Further details concerning the nature and preparation of the above described polyoxides can be found in U.S. Patents Nos. 2,633,458, 2,872,427 and 2,884,408, among others, which are incorporated herein by reference.

The resulting catalyzed polyepoxide-containing compositions can be used in any of the applications for which polyepoxides are customarily used, e.g., as adhesives, impregnants, surface coatings, potting and encapsulating compositions, in laminates, and particularly, in glass cloth-filled laminates for use in electrical applications such as printed circuits and the like, in castings for electrical apparatus, and the like.

Various conventionally employed additives can be admixed with these novel aminoalkyldicyandiamide catalyzed polyepoxide-containing compositions prior to final cure. For example, in certain instances, it may be desired to add minor amounts of co-catalysts or hardeners along with the novel curing agent. Included among these known catalysts and hardeners are alkali metal hydroxides, e.g., sodium or potassium hydroxide; alkali metal alkoxides and phenoxides, e.g., sodium phenoxides; primary, secondary and tertiary monoamines and polyamines, e.g., mono-, di- and trimethylamine, mono-, di- and triethylamine, isopropylamine, diisopropylamine, butylamine, dibutylamine, cyclohexylamine, dicyclohexylamine, diethylaminopropylamine, benzylamine, benzyldimethylamine, diethylenetriamine, dipropylenetriamine, dibutylenetriamine, triethylenetetramine, tetraethylenepentamine, N,N-diethyl-1,3-propanediamine, 1,2-diamino - 2 - methylpropane, 2,3-diamino-2-methylbutane, 2,4-diamino-2-methylpentane, ethanolamine, triethanolamine, diethylethanolamine, aniline, dimethylaniline, dimethylaminoethylphenol, tri(dimethylaminomethyl)phenol, dicyandiamide, melamine, diallylmelamine, and the like, as well as fatty acid salts thereof, e.g., tri(dimethylaminomethyl)phenol tri(2-ethylhexoate), and the like; polycarboxylic acids, e.g., oxalic acid, succinic acid, phthalic acid, maleic acid, and the like, as well as the corresponding anhydrides, and phenolic compounds, e.g., phenol, cresols, xylenols, resorcinol, and the like. Conventional pigments, dyes, fillers, flame-retarding agents and other compatible natural and synthetic resins can also be added. Furthermore, known solvents for the polyepoxide materials, such as acetone, methyl ethyl ketone, methyl isobutyl ketone, dioxane, Cellosolve acetate, methyl Cellosolve acetate, dimethylformamide, trichloropropane, benzene, toluene, xylene, and the like, can be used if desired, e.g., in coating formulations.

Depending on the composition itself and the end use for which it is intended, curing, i.e., advancing the polyepoxy component of the composition and any other component co-reactable therewith to a state of substantial insolubility and infusibility, can take place at temperatures ranging from about room temperature, i.e., about 25° C., or below (when the amount of catalyst present is at or near the upper limit of the above stated range or, at lower catalyst concentrations, over a relatively long period of time) to about 200° C.

PREPARATION OF DICYANDIAMIDE DERIVATIVES AS CURING AGENTS FOR EPOXY RESINS

*Preparation of 1-(γ-diethylamino)-propyldicyandiamide.*—To a two liter r.b. flask (3 neck), equipped with a condenser, stirrer, thermometer and dropping funnel, was added 325.5 grams (1.0 mole) of diethylaminopropylamine. The exotherm caused by the addition of 100 g. (1.0 mole) of conc. hydrochloric acid to the amine was controlled by means of an ice bath. The pH of the solution was adjusted to 6.7 just prior to the addition of 222.5 grams (0.5 mole) of sodium dicyanamide. The solution was then heated at the reaction temperature of 90°–95° C. for approximately 30 hours. The reaction was then cooled down to room temperature and 200 grams of sodium hydroxide pellets added. The product which precipitated was filtered and washed free of any soluble salt. The amount of product collected weighed 305 grams (62% yield) and melted at 115°–118° C.

*Preparation of dimethylaminoethylbenzyldicyandiamide.*—Eighty-nine grams (0.5 mole) of dimethylaminoethylbenzylamine was neutralized with 1.0 mole of diluted hydrochloric acid and the pH adjusted to 6.7. To this solution there was added 49.9 grams (0.5 mole) of sodium dicyandiamide. The reaction was heated to 90–95° C. on the steam bath for six hours and then cooled to room temperature. While stirring a 44% solution of sodium hydroxide (0.5 mole) was added which resulted in the product precipitating from solution. The product, which was washed with water and dried, weighed 126.0 grams (52% yield) and melted at 141–149° C. The product was recrystallized from xylene and had a melting point at 153°–156° C.

This compound was tested in the standard epoxy formulation, and found to contain no epoxy groups on analysis after curing for 90 minutes at 225° F., with room temperature stability of approximately 4–5 days.

*Preparation of dimethylaminopropyldicyandiamide.*—Two hundred fifty-five grams (2.5 moles of dimethylaminopropylamine was neutralized with 5.0 moles of diluted hydrochloric acid. The pH of the reaction was adjusted to 6.7 using the amine before the addition of 222.5 grams (2.5 moles) of sodium dicyandiamide. The reaction was heated at approximately 90°–95° C. for 23 hours and then cooled to room temperature before the addition of 100 grams (2.5 moles) of sodium hydroxide pellets. The solution was evaporated to dryness and then treated with hot butanol to extract the dicy derivative from the salt. The product obtained had a melting point at 85°–95° C.

In order that those skilled in the art may more fully understand the inventive concept presented herein, the following examples are set forth. All parts and percentages are by weight, unless otherwise stated.

*Example I*

One hundred parts of a commercially available bisphenol A-epichlorohydrin thermosetting epoxy resinous condensate having a viscosity (measured at 25° C.) of 100–160 poises, an average molecular weight of 350 to 400 and an epoxide equivalent (grams of resin containing one gram-equivalent of epoxide) of 175–210, were heated to 175° F. in a suitable container. Next, ten parts of 3-diethylaminopropyldicyandiamide and five parts calcium silicate were added, and the resulting mixture was stirred for a few moments to disperse the curing agent in a viscous syrup.

This viscous syrup was brushed over an aluminum plate and a second aluminum plate was superimposed thereon, and these two clamped together squeezing out excess adhesive. This was then placed in an oven at 175° F. for one hour. At the end of this time, the aluminum sections were firmly bonded together. The thermal stability of the bond was such that on reheat to 350° F. the sections remain firmly bonded.

The extent of reaction of the epoxide groups in any adhesive is a critical factor in imparting chemical and thermal resistance to the adhesive. We have found that samples of the above commercial bisphenol A-epichlorohydrin epoxy resinous adhesive condensate shows complete or near complete cure when reacted with 10 parts per hundred of 3-diethylaminopropyldicyandiamide. This can be determined by reducing the cured resins to a fine powder (60 mesh) in a Wiley mill and analyzing for unreacted epoxy groups by first swelling the particles in dioxane, reacting with hydrochloric acid and titrating with base. This is a standard method for evaluation of the degree of cure obtained in an epoxy resin. Typical results for a tested sample are tabulated below:

| Material | Cure Cycle | Equivalent Epoxide Groups/100 grams of Epoxide |
|---|---|---|
| Uncured Epoxide Resin | | 0.50 eq./100 g. |
| Cured Epoxide/curing agent | 180° F./90 min. | 0.02 eq./100 g. |

Therefore, from the above data, it can be seen that the epoxide adhesive resin cured with 3-diethylaminopropyl-dicyandiamide at 180° F. was about 95 percent reacted after 90 minutes of cure time.

To illustrate the cure advantages of my novel curing agents over dicyandiamide in the cure of epoxide adhesives, the following tabulated comparative data is set forth in Table I below:

TABLE I

| | Curing Agent | |
|---|---|---|
| Cure Cycle | 3-diethylaminopropyl dicyandiamide | 50% Dicyandiamide, 50% Hexamethylene-tetramine |
| 175° F./30 min. | Flexible gum, very tacky | Fluid. |
| 175° F./45 min. | Slightly brittle, still very tacky. | Do. |
| 175° F./60 min. | Hard, brittle, tack free | Do. |

From the foregoing data, it can be seen that at the low temperature where aluminum alloys are not adversely effected, applicants' curing agent cures the epoxide to a hard thermally and chemically resistant bond whereas the dicyandiamide-hexamethylene (50/50 by weight of) curing agents blend did not cure the bisphenol A-epichlorohydrin epoxy resin in 60 minutes. In fact, these latter known curing agents were not effective in any measure until a temperature of 300–325° F. for up to two hours cure time was reached at which point the aluminum alloy honeycomb structures are adversely affected by metal crystallization due to the high thermal stress.

*Example II*

One hundred parts of the same commercially available bisphenol A-epichlorohydrin thermosetting epoxy resinous condensate set forth in the preceding Example I was heated to about 175° F. and admixed in a suitable container with ten parts of the compound 1-(2-dimethylaminoethyl)-1-benzyldicyandiamide and five parts of commercial calcium silicate to disperse the curing agent.

The mixture set to a hard, brittle, tack free adhesive mass after 45 minutes at 180° F. This hard cured resinous casting was evaluated in a manner similar to the product produced above and was found to be quite satisfactory as a cured epoxy bonding agent for sections of aluminum metal.

In addition to the several dialkyl aminoalkyldicyandiamides illustrated in the preceding examples other members of the series such as the compositions dibutylaminopropyldicyandiamide, dimethylaminohexyldicyandiamide, dipropylaminooctyldicyandiamide, dimethylaminohexyl-1-benzyl dicyandiamide, dihexylaminooctyldicyandiamide, diethylaminoethyldicyandiamide, dipropylaminoethyldicyandiamide, dimethylaminobutyldicyandiamide, dipentylaminopropyldicyandiamide, dipropylaminopropyldicyandiamide, methylethylaminopropyldicyandiamide, 1-(2-methylethylaminoethyl)-1-benzyldicyandiamide, ethylpropylaminopropyldicyandiamide, and 1-(2-methylpropylaminoethyl)-1-benzyl dicyandiamide would be expected to perform in an equivalent manner to achieve the advantageous result described herein. Of course certain other obvious variations in my basic concept will occur to those versed in the art after considering the inventive subject matter described hereinabove. It is intended that the appended claims embrace any and all of these variations.

I claim:

1. A composition comprising (A) an organic polyepoxide material having a plurality of reactive 1,2 epoxy groups and (B) as a curing agent an amount of a substituted aminoalkyldicyandiamide having the structure:

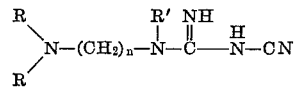

wherein R represents a lower alkyl group of from 1 to 6 carbon atoms, R' represents a substituent selected from the group consisting of hydrogen and benzyl and $n$ is an integer from 2 to 10 inclusive.

2. A composition according to claim 1 wherein the curing agent (B) is a compound wherein the R substituent is ethyl.

3. A composition according to claim 1 wherein the curing agent component (B) is a compound wherein the R substituent is methyl.

4. A composition according to claim 1 wherein the curing agent component (B) is the compound 3-diethylaminopropyl dicyandiamide.

5. A composition according to claim 1 wherein the curing agent component (B) is the compound 1-(2-dimethylaminoethyl)-1-benzyldicyandiamide.

References Cited

Lee et al.: "Epoxy Resins," page 110 relied on, McGraw-Hill Book Co., Inc., New York, 1957.

WILLIAM H. SHORT, *Primary Examiner.*

T. D. KERWIN, *Assistant Examiner.*